(12) United States Patent
Osmond

(10) Patent No.: US 6,287,369 B1
(45) Date of Patent: Sep. 11, 2001

(54) LOW PRESSURE RADON STRIPPER FOR WELLS

(76) Inventor: David W. Osmond, 181 Oxbow Rd., Wayland, MA (US) 01778

( * ) Notice: Subject to any disclaimer, the term of this patent is extended or adjusted under 35 U.S.C. 154(b) by 0 days.

(21) Appl. No.: 09/538,196

(22) Filed: Mar. 30, 2000

(51) Int. Cl.[7] .................................................. B01D 19/00
(52) U.S. Cl. .............................................. 96/202; 95/263
(58) Field of Search ............................ 95/245, 246, 254, 95/263, 265; 96/202, 203; 210/188

(56) References Cited

U.S. PATENT DOCUMENTS

| | | | |
|---|---|---|---|
| 4,371,383 | * | 2/1983 | Rost . |
| 4,756,724 | * | 7/1988 | Yuill . |
| 4,869,832 | * | 9/1989 | Lamarre ................................. 95/263 |
| 5,104,554 | | 4/1992 | Dempsey . |
| 5,279,746 | * | 1/1994 | Ziol ....................................... 95/116 |
| 5,614,086 | * | 3/1997 | Hill et al. ................................ 95/245 |
| 5,660,721 | * | 8/1997 | Kyriss et al. ........................... 96/157 |
| 5,858,071 | * | 1/1999 | Nilsson ................................... 96/170 |
| 5,980,613 | * | 11/1999 | Reiber ..................................... 96/202 |

* cited by examiner

Primary Examiner—Duane S. Smith
(74) Attorney, Agent, or Firm—Lambert & Associates PLLC; Gary E. Lambert; Edward Timmer

(57) ABSTRACT

A radon stripper system for removing radon from well water including a draft tube and an air supply line that is interfaced with a gas supply. The draft tube is vertically aligned beneath the surface of the water in a well. Gas is delivered into the draft tube a sufficient distance induces a flow in the well water. The gas interface between the gas delivered to the radon stripper system and the well water is increased. The induced water flow and increased gas to radon-contaminated water interface removes the radon from the well water.

19 Claims, 2 Drawing Sheets

LOW PRESSURE RADON STRIPPER FOR WELLS

FIELD OF THE INVENTION

The present invention relates to radon gas and more particularly to a method of efficiently removing radon gas from well water contaminated by radon gas.

BACKGROUND OF THE INVENTION

Radon is a naturally occurring, sparingly water soluble radioactive gas that results from the breakdown of uranium in soil, rock and water. Research has linked radon to causing cancer. In fact, the Surgeon General has reported that radon is the second leading cause of lung cancer in the United States. Although radon is more prevalent in certain areas of the U.S., radon can be found in all parts of the U.S. Therefore, the risks associated with exposure to radon gas are common throughout all parts of the U.S.

Radon can get into any type of building and build up to high levels of concentration. Since most people spend a majority of their time in their homes, people are at the greatest risk of radon exposure in their own homes. Given the potential health hazards presented by radon, the Environmental Protection Agency (EPA) suggests and some states even mandate that residential homes be tested for the presence of radon.

While no amount of exposure to radon gas is considered "safe" since any exposure to radon gas poses a health risk, the Surgeon General and the EPA recommend testing for radon and the reduction of radon in homes that have high levels. The recommendation advises reducing and maintaining radon levels in the home to less than 4 picocuries per liter (pCi/L). While radon usually enters a home by diffusion from the underlying soil, radon may also enter a home through the water delivered to the home. Homes serviced by well water are at the greatest risk of having radon contaminated water since the radon in public utility supplied water supplies is usually radon free by the time the water is delivered to the home. Radon in the well water is released into the air in the house when water is used for showers or other household tasks.

There are two fundamental methods to treat and remove radon from water contaminated by radon gas. The two techniques generally involve removing the radon by aeration or granular activated carbon (GAC) filtration. The GAC method involves filtering water through filter(s) containing carbon granules that absorb the radon gas as the water is passed through the filter at either the point-of-entry into the house or at the point-of-delivery. Radon attaches to the carbon and leaves the filtered water radon-free. An unavoidable and undesirable side effect of this method is that the radon deposited in the filter decays to Pb-214, a radioactive isotope of lead. The lead-laced carbon filters require constant monitoring and must eventually be disposed of as low-level radioactive waste. The disposal of low-level radioactive waste is an unwanted and cost-prohibitive proposition for most homeowners.

The aeration method involves introducing air into the water supply to increase the gas-liquid interface, thereby allowing the radon gas dissolved in the water to diffuse into the gas phase. The air/radon gas mixture is then vented from the water supply and the water is delivered for use radon-free. Most aeration systems include bubble towers or spray chambers requiring depressurization of the incoming water supply, dropping the water through air or bubbling air through the water to create a counter-flow between the air and water so that the introduced air "strips" or absorbs the radon dissolved in the water and then repressurizing the outgoing water. This type of system requires a significant initial capital investment in equipment that is cost-prohibitive for most homeowners. The recurring maintenance costs associated with this type of systems also makes it all but impractical to individual homeowners depending on well water. This type of system also requires a rather large space to accommodate the tower and associated equipment. If located in a home there exists the constant risk that the radon removed from the water may enter the home before being completely vented away.

A variation of the bubble tower type aeration system is disclosed in U.S. Pat. No. 5,104,554 issued to Dempsey Apr. 14, 1992. The Dempsey device injects compressed air inside of a well's casing below the well pump's inlet. The well casing, in effect, functions as a bubble tower similar to those in the previously described aeration systems. The Dempsey system may be adequate in some shallow wells where the overall depth of the well is relatively shallow. Most modern wells are deep 200 to 600 and the Dempsey system would require the use and delivery of highly compressed air >100 psi in deep wells. Using highly compressed air in the Dempsey system will cause the water delivered for use to effervesce and appear unacceptably milky at the point of delivery. Additionally, a system under high pressure, especially a system under constant high pressure, is prone to increased maintenance and/or repair costs due to the high pressure continually placed on the system.

SUMMARY OF THE INVENTION

The present invention results in view of the above circumstances and the realization that an effective, cost-efficient and reliable method and system for removing radon gas dissolved in well water is effectuated by placing a draft tube in a well, the draft tube extending down into the well water a substantial distance; inserting an air supply line down into the upper portion of the draft tube for delivery of air into the draft tube; and periodically delivering an input of low pressure air into the draft tube through the air supply line. This method and system effectively "strips", i.e. removes the dissolved radon gas from well water, even in very deep wells while operating only with very small constant flow or even episodically delivered low pressure air to the draft tube. The low pressure air delivered into the draft tube effectively circulates the well water; thus increasing the interface between the air delivered to the draft tube and the radon gas sufficiently to remove substantially all of the radon dissolved in the well water.

DETAILED DESCRIPTION OF THE PREFERRED EMBODIMENT

Figure 1:
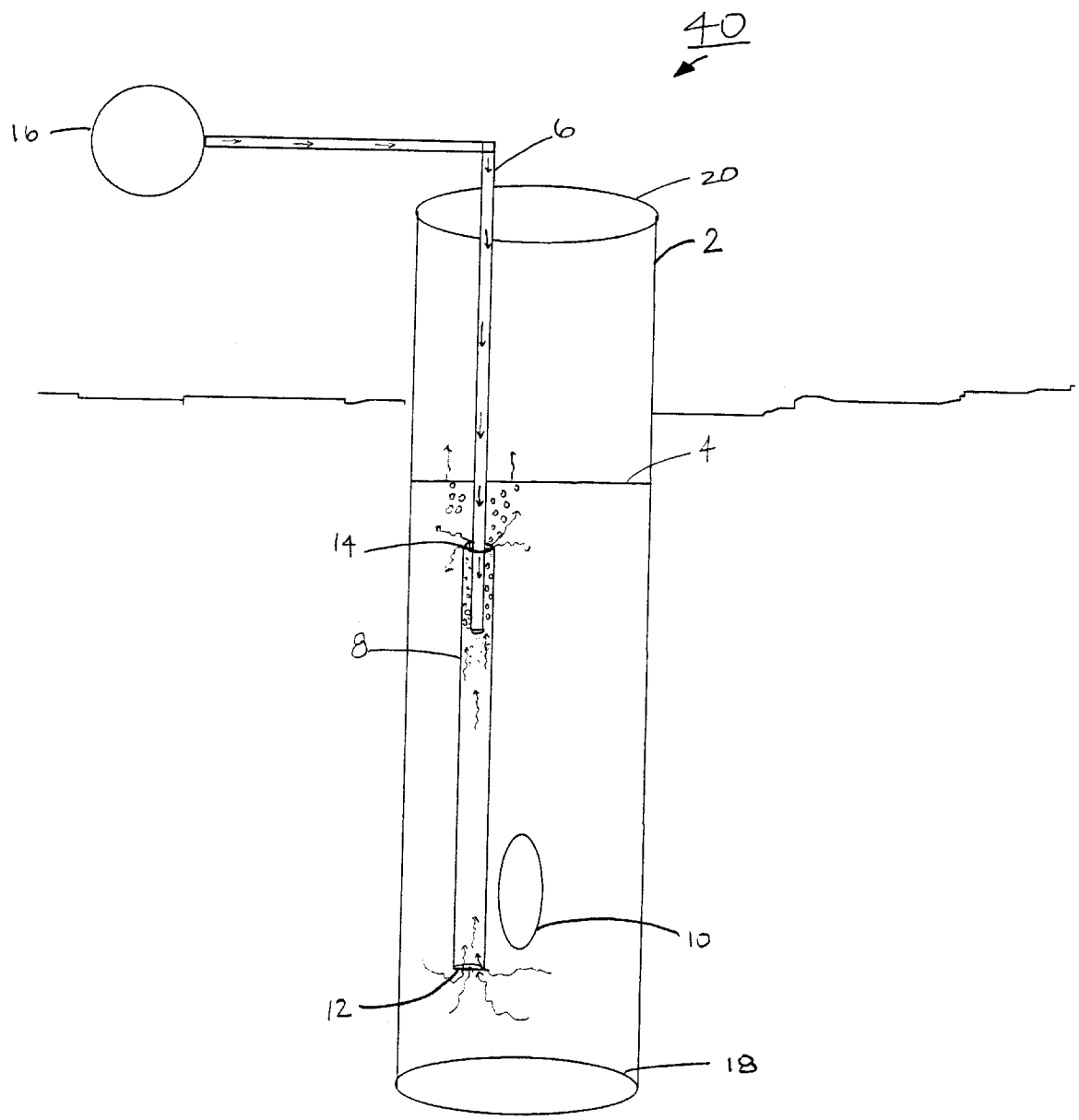
FIG. 1 is a plan view of a preferred embodiment of the present invention having a draft tube extending down into the well water yet terminating at some point short of the bottom of the well.

A preferred embodiment of the present system 40 for removing dissolved radon from well water is depicted in FIG. 1. The system 40 comprises a draft tube 8 inserted into a well casing 2 a predetermined distance below the lowest normal operating surface level 4 of the well water and an air supply line 6 for delivering air some distance down into the draft tube. The air delivered into the draft tube is normally delivered under low pressures. Air compressor 16 is provided to facilitate delivery and introduction of air into the draft tube via the air supply line attached thereto. The present invention obviates the need to deliver the air under high pressure. The draft tube typically extends substantially the entire depth of the well, starting at a point below the lowest normal operating water level 4 and extending downward therefrom. In a typical embodiment, the lower end 12 of the draft tube 8 terminates at some point short of the bottom of the well 18. The draft tube 8 terminates short of the well bottom 18 so as not to have debris on the bottom of the well 18 drawn into the draft tube 8. Debris brought up from the bottom of the well undesirably increases the likelihood of introducing the same debris into the water supply that is eventually pumped to the point of use. The draft tube 8 has an opening at both its lower end 12 and its upper end 14 for facilitating the passage of water and gasses therethrough. The draft tube 8 is thus typically large enough to accommodate both the air supply tube 6 and allow sufficient passage of air and water therethrough.

The well water pump 10 that pumps water from the well to its point of delivery is typically submersible and located in the well itself. At the very least, the inlet to the well water pump 10 is located in the water inside of the well. The relative location of the well pump 10 in a preferred embodiment can be further seen in FIG. 1. The well water pump 10 is shown located above the lower end 12 of the draft tube 8. The pump 10 and the draft tube 8 are relatively spaced as shown so that the water present at the inlet of the well water pump 10 has had adequate opportunity to circulate throughout the system and have the radon removed from the water at the pump's inlet before being pumped and delivered by the pump 10 for use.

The operation of the present system will now be explained. FIG. 1 should be referred to at all times throughout the following discussion for a full understanding of the invention and the method of its operation. The system is typically installed in a residential well that supplies water to a residence although other bodies/supplies of water may be effectively treated by the system presented herein. Since the system is deployed at least partially in the well itself, a full understanding of the well layout should be had before installing the system 40. An understanding of the well dimensions is advisable so that system components of sufficient size are available at the installation of the system. Therefore, it is important to know the overall depth of the well and the lowest normal operating level of the well water in the well. In order to allow proper operation of the system 40, the upper end 14 of the draft tube 8 should not be installed above the surface of the well water. Thus, the upper end 14 of draft tube 8 should be deployed in the well casing 2 below the lowest normal operating level of the well water.

The lower end of draft tube 8 terminates short of the bottom of the well 18. The lower end of the draft tube 8 is sufficiently above the bottom 18 of the well so as not to have an excessive amount of debris brought into the draft tube. Additionally, the draft tube 8 is far enough above the well bottom 18 to allow for adequate and sufficient flow of well water into and through the draft tube 8.

The system 40 may be supported in it's operable position by attaching mechanical supports to the physical supports that typically support the submersible well pump 10. Alternatively, the system 40 may be supported by independant support(s). The supports may be wires, cable, ropes, and other mechanical supports out rigged from the well casing 2.

When the draft tube 8 is operably positioned in the well casing 2, the air supply line 6 is then disposed into the draft tube 8 with the free end of the air supply tube 6 positioned down into the draft tube 8. The air supply line 6 is positioned a sufficient distance into the draft tube 8 to induce a flow of water up through the draft tube 8 with the introduction of air into the draft tube 8. When air is introduced into the draft tube 8, the air delivered down into the draft tube bubbles up and out of the top of the draft tube 8. As the air comes into contact with the radon-contaminated water, the radon dissolved in the water diffuses with the introduced air and is "stripped" out of the water.

Furthermore, the movement of the introduced air and air-radon gas mixture induces a flow of water in the draft tube 8. The movement of the gasses in the draft tube 8 induces an upward flow of water into and throughout the draft tube 8. The arrows in the FIG. 1 depict this induced movement of water. As shown, the water in the well is thus circulated through the system 40.

Through research, the Applicant has verified that continuous operation of the system 40 is not necessary to effectively remove substantially all of the radon in a well contaminated by radon. A system configured as shown in FIG. 1, deployed in a 6 inch diameter well, 350 feet deep was effective in reducing the radon levels in the well water from 22,000 pCi/L to less than 500 pCi/L. The EPA recommends that radon in water be kept at levels in the 2,000 to 20,000 pCi/l range.

Figure 2:
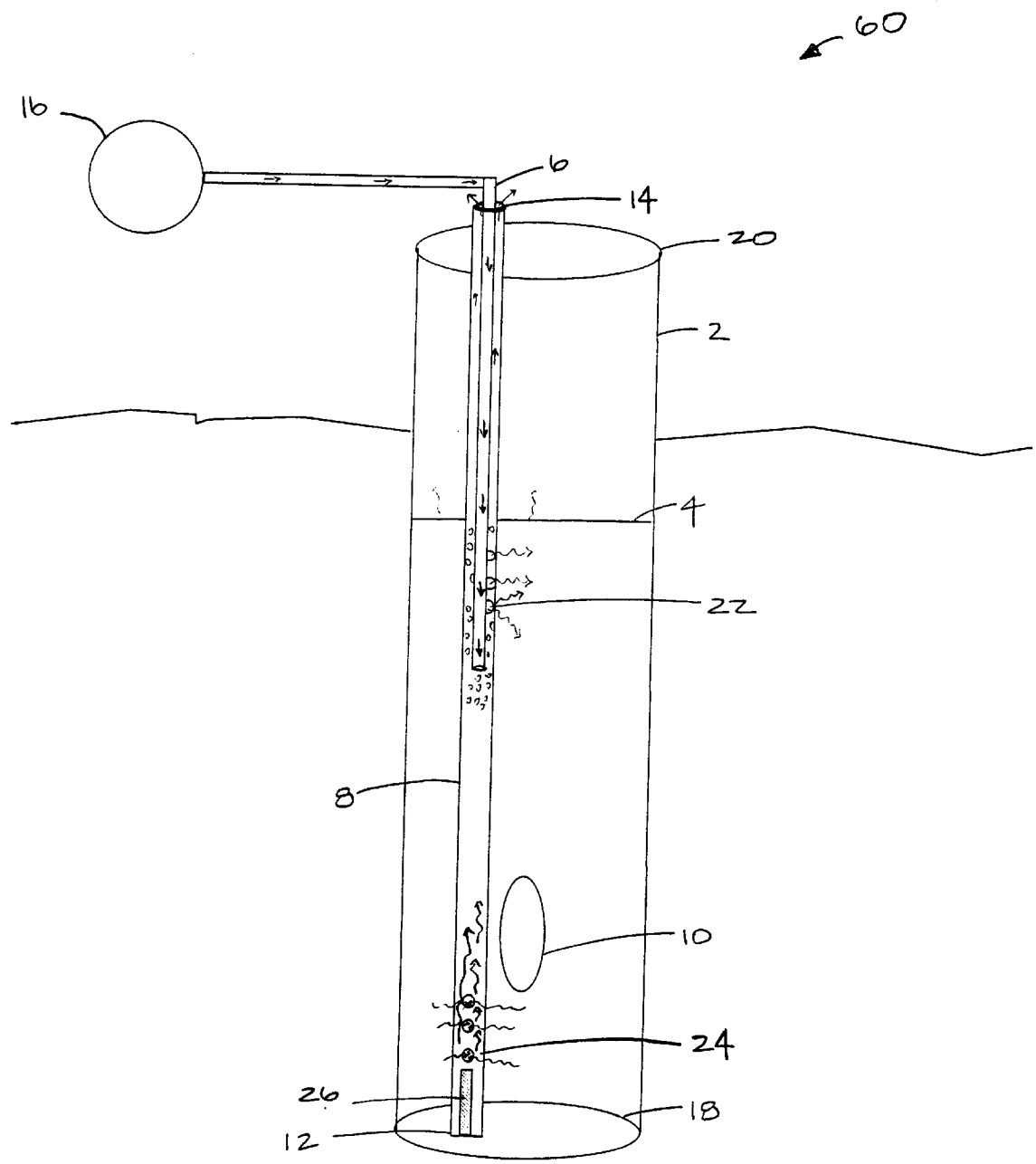
FIG. 2 is a plan view of a preferred embodiment of the present invention having a draft tube extending down into the well water and terminating at the bottom of the well.

Another embodiment of the present invention, system 60, is depicted in FIG. 2. Particular differences of the FIG. 2 embodiment are the length the draft tube 8 and the presence of inlet holes 24 and outlet holes 22 in the draft tube 8. The draft tube 8 of system 60 extends to the bottom of the well 18. In this embodiment, the upper end of the draft tube 8 may extend above the surface of the water. To ensure that the draft tube 8 remains in its installed position, there is weighted ballast 26 deployed in the base of the draft tube 8. The draft tube in FIG. 2 is sealed at its lower end 12. Therefore, in order for system 60 to operate along the same principles as the system 40 described above, the draft tube 8 has inlet holes 24 and outlet holes 22 to facilitate the circulation of water through the system 60 when air is introduced into the draft tube 8. The inlet holes 24 and the outlet holes 22 should be positioned in spaced apart configuration so that a circulatory flow of water is induced in the draft tube 8 due to the introduction of gas thereto. The inlet holes 24 are typically positioned above the outlet holes 22 in order to allow the radon to be "stripped" from the water in the draft tube 8. As the air-radon gas mixture rises in the draft tube subsequent to the introduction of the air into the draft tube, a circulating flow of water is induced in the draft tube. The arrows in the FIG. 2 depict the induced circulating flow of water.

An additional distinction of the system 60 shown in FIG. 2 lies in the fact that the system 60 may be installed without the need to anchor the system 60 to other structures in order to maintain the low pressure radon stripper system in its installed and operable position. The ballast 26 should be sufficiently weighted to maintain the draft tube 8 at its intended position.

In other embodiments, the draft tube and other components comprising the system may be constructed from materials, including plastics, having densities less than water. The advantage of the draft tube 8 being constructed from such lesser density materials is that the draft tube tends to self-align itself, thus allowing the water and air to freely circulate through the system. Also, in the event a component of the system becomes disconnected, the disconnected piece will float to the top of the water for easy retrieval of the component.

As such, the system and method of removing radon from a water supply detailed above constitutes the Applicant's preferred and alternate embodiments of the invention. While the invention has been described and illustrated with reference to specific embodiments, it is understood that these and other embodiments may be resorted to without departing from the invention. Therefore, the form of the invention set out above should be considered illustrative and not as limiting the scope of the following claims.

What is claimed is:

1. A radon stripper system for removing radon from well water comprising:
   a draft tube having a first end and a second end; and
   an air supply line having a first end and a second end, wherein the first end of said air supply line interfaces with a gas supply and the second end of said air supply line is free for delivering gas to the radon stripper system;
   whereby placing said draft tube in a well with the first and second ends of said draft tube below the surface level of the water and vertically aligned in a well and delivering gas into said draft tube from the first end of said air supply line interfaced with a gas supply, through said air supply line, and out of the second end of said air supply line into said draft tube has the effect of increasing the gas to water interface between the gas delivered to the radon stripper system and the well water and induces a flow in the well water for effectively removing radon from the well water.

2. The radon stripper system of claim 1 wherein the first end of said draft tube is above the second end of said vertically aligned draft tube.

3. The radon stripper system of claim 1 wherein the second end of said air supply line is disposed into said draft tube through the first end of said draft tube for the delivery of gas into the radon stripper system.

4. The radon stripper system of claim 1 wherein the second end of said air supply line is disposed into said draft tube through the second end of said draft tube for the delivery of gas into the radon stripper system.

5. The radon stripper system of claim 1 further comprising a compressor for supplying gas under pressure to the first end of said air supply line interfacing with said compressor.

6. The radon stripper system of claim 5 wherein said compressor supplies gas under low pressure.

7. The radon stripper system of claim 6 wherein said compressor supplies gas under pressures in the range of about 25 pounds per square inch to about 75 pounds per square inch.

8. The radon stripper system of claim 1 wherein the second end of said draft tube terminates above the bottom of a well, so that debris on the bottom of a well is not introduced into the radon stripper system.

9. The radon stripper system of claim 8 wherein said draft tube has apertures at both the first end and the second end of said draft tube and a passageway connecting the inlet and outlet apertures and extending through said draft tube for facilitating the passage of water and gasses therethrough.

10. The radon stripper system of claim 9 wherein the apertures and passageway in said draft tube are sufficiently sized to accommodate both said air supply line and sufficient passage of water and gas flow induced therein for the effective removal of radon from the radon stripper system.

11. The radon stripper system of claim 1 wherein the second end of said draft tube terminates on the bottom of a well.

12. The radon stripper system of claim 11 further comprising a weighted ballast disposed in a lower portion of said draft tube for maintaining the second end of said draft tube in its installed position on the bottom of a well.

13. The radon stripper system of claim 11 further comprising inlet apertures and outlet apertures disposed in said draft tube below the surface level of the water and a passageway connecting the inlet and outlet apertures and extending through said draft tube for facilitating a flow of water in the radon stripper system induced as a result of the delivery of gas into said draft tube.

14. The radon stripper system of claim 11 wherein the inlet apertures and outlet apertures and passageway in said draft tube are sufficiently sized to accommodate sufficient passage of water and gas flow induced therein by the delivery of gas into said draft tube for the effective removal of radon from the radon stripper system.

15. The radon stripper system of claim 11 wherein the first end of said draft tube extends above the surface level of the water in a well.

16. The radon stripper system of claim 11 wherein the second end of said air supply line delivers gas into said draft tube through the first end of said draft tube.

17. The radon stripper system of claim 16 wherein the second end of said air supply line extends down below the outlet apertures disposed in said draft tube.

18. The radon stripper system of claim 1 further comprising a pump for removing water from a well, the pump having an inlet for in taking water from the well.

19. The radon stripper system of claim 18 wherein the inlet of said pump is positioned above the second end of said draft tube.

* * * * *